(12) United States Patent
Jeong (10) Patent No.: US 10,168,562 B2
(45) Date of Patent: Jan. 1, 2019

(54) DISPLAY DEVICE

(71) Applicant: Samsung Display Co., Ltd., Yongin-Si, Gyeonggi-Do (KR)

(72) Inventor: Wee-joon Jeong, Seongnam-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 135 days.

(21) Appl. No.: 15/290,075

(22) Filed: Oct. 11, 2016

(65) Prior Publication Data

US 2017/0131587 A1 May 11, 2017

(30) Foreign Application Priority Data

Nov. 5, 2015 (KR) .................. 10-2015-0155332

(51) Int. Cl.
*G02F 1/1333* (2006.01)
*F21V 8/00* (2006.01)

(52) U.S. Cl.
CPC ..... *G02F 1/133308* (2013.01); *G02B 6/0086* (2013.01); *G02F 2001/133317* (2013.01); *G02F 2001/133328* (2013.01)

(58) Field of Classification Search
CPC ... G02F 1/133308; G02F 2001/133317; G02B 6/0086
USPC ......................................................... 349/58
See application file for complete search history.

(56) References Cited

U.S. PATENT DOCUMENTS

| | | | |
|---|---|---|---|
| 6,199,987 B1* | 3/2001 | Haba | G02B 27/283 348/E5.139 |
| 9,280,009 B2* | 3/2016 | Hsiao | G02F 1/133308 |
| 2001/0050732 A1* | 12/2001 | Okamoto | G02F 1/133308 349/58 |
| 2010/0073594 A1* | 3/2010 | Miyazaki | G02F 1/133308 349/58 |
| 2013/0033657 A1 | 2/2013 | Li et al. | |
| 2013/0088661 A1 | 4/2013 | Shin et al. | |
| 2013/0215363 A1 | 8/2013 | Zhang | |
| 2013/0308074 A1 | 11/2013 | Park et al. | |
| 2014/0085934 A1 | 3/2014 | Kuo et al. | |
| 2014/0313116 A1* | 10/2014 | Jang | G02F 1/133308 345/102 |

FOREIGN PATENT DOCUMENTS

| KR | 1020060000268 A | 1/2006 |
|---|---|---|
| KR | 1020060056161 A | 5/2006 |

(Continued)

*Primary Examiner* — Lucy P Chien
(74) *Attorney, Agent, or Firm* — Cantor Colburn LLP (57) ABSTRACT

A display device includes a display panel including an upper surface, a rear surface facing the upper surface, and a side surface connecting the upper and rear surfaces to each other, a mold frame under the display panel and defining a first frame portion thereof facing the rear surface of the display panel, and a second frame portion extended bent downwards from side surfaces of the first frame portion; and a guide member detachably coupled to the mold frame, the guide member defining a first portion thereof configured to face an outer surface of the second frame portion, the first portion extending bent to define a second portion of the guide member, the second portion configured to face the side surface of the display panel when the first portion faces the outer surface of the second frame portion.

20 Claims, 9 Drawing Sheets

(56) References Cited

FOREIGN PATENT DOCUMENTS

| KR | 1020130027204 A | 3/2013 |
| KR | 1020140070201 A | 6/2014 |
| KR | 1020150045657 A | 4/2015 |

* cited by examiner

DISPLAY DEVICE

This application claims priority to Korean Patent Application No. 10-2015-0155332, filed on Nov. 5, 2015, and all the benefits accruing therefrom under 35 U.S.C. § 119, the content of which in its entirety is hereby incorporated by reference.

BACKGROUND

1. Field

The invention relates to a display device.

2. Description of the Related Art

As a flat panel display device, various display devices, such as a liquid crystal display device, a plasma display device, a field emission display device, a light emitting diode display device, an organic light emitting diode display device, etc., have been developed.

The liquid crystal display device is widely applied in various fields since the liquid crystal display device has advantages, e.g., development in mass production, ease in driving, low power consumption, thin thickness, high-definition display quality, large-sized display screen, etc.

For the flat plan display device, there is a growing need for research and development of such products in a variety of designs in addition to technical development thereof.

SUMMARY

One or more exemplary embodiment of the invention provides a display device having a relatively slim design.

One or more of the exemplary embodiment of the invention provides a display device capable of protecting a display panel therein and having improved display quality.

Exemplary embodiments of the invention provide a display device including a display panel, a mold frame, and a guide member.

The display panel includes an upper surface at which an image is displayed, a rear surface facing the upper surface, and a side surface connecting the upper surface and the rear surface to each other.

The mold frame is disposed under the display panel and defines a first frame portion thereof facing the rear surface of the display panel, the first frame portion extended bent to define a second frame portion of the mold frame extending away from the display panel.

The guide member is detachably coupled to a corner of the mold frame. The guide member define first portion thereof configured to face an outer surface of the second frame portion of the mold frame, the first portion extending bent to define a second portion of the guide member, the second portion configured to face the side surface of the display panel when the first portion faces the outer surface of the second frame portion.

The guide member attached to the mold frame may define a first state of the display device, and the guide member separated from the mold frame may define a second state of the display device.

The outer surface of the second frame portion may define a first area thereof facing the first portion and a second area thereof except for the first area. The first portion directly makes contact with the first area of the second frame portion in the first state of the display device.

The display device may further include an adhesive member overlapped with the first area and disposed between the second frame portion and the first portion.

The first portion of the guide member may extend toward the second frame portion of the mold frame to further define a third portion of the guide member connected to the second frame portion and extending further than a distal end of the first portion. The third portion may have a thickness smaller than a thickness of the first portion in a direction substantially perpendicular to the upper surface of the display panel.

The second frame portion of the mold frame may extend to define the guide member and the first to third portions thereof. In the second state of the display device, the guide member may be separated from the mold frame at a boundary between the third portion of the guide member and the second frame portion of the mold frame.

In the first area of the second frame portion of the mold frame, the second frame portion may define a slit recessed from the outer surface of the second frame portion, and a shape of the slit may correspond to a shape of the third portion of the guide member. In the first state of the display device, the third portion of the guide member may extend into the slit defined in the second frame portion of the mold frame to detachably couple the guide member and the mold frame to each other.

The display device further includes an adhesive member disposed between the display panel and the first frame portion of the mold frame.

In a top plan view of the display device, the upper surface of the display panel may include a display area in which the image is displayed and a non-display area which surrounds the display area and in which the image is not displayed, and the mold frame may have a ring shape extending along the non-display area. In the top plan view of the display device, the first frame portion of the mold frame may be overlapped with the non-display area of the display panel, and the non-display area may have a size larger than a size of the first frame portion to extend further than the mold frame.

In the top plan view of the display device, the first frame portion of the mold frame may be overlapped with the non-display area of the display panel, and the first frame portion may have a same size as the non-display area to define the side surface of the display panel and the outer surface of the second frame portion of the mold frame coplanar with each other.

The display device further includes a light source assembly and a bottom chassis.

The light source assembly generates and provides a light to the display panel.

The bottom chassis defines a bottom portion thereof facing the rear surface of the display panel, the bottom portion extended bent to define a sidewall portion of the bottom chassis extending toward the display panel.

The mold frame defines a first frame portion thereof disposed overlapping the bottom portion and the sidewall portion of the bottom chassis, the first frame portion extended bent to define a second frame portion of the mold frame extending away from the display panel to face an outer surface of the sidewall portion of the bottom chassis.

The display device may define plural side surfaces thereof, where adjacent side surfaces meet to form plural corners of the display panel. The guide member may include a first sub-guide member facing each corner among the plural corners of the display panel, and a second sub-guide member facing at least one side surface among the plural side surfaces of the display panel. The first sub-guide member at a respective corner of the display panel and the second sub-guide member at a respective side surface of the display panel may be spaced apart from each other by a predetermined distance along the respective side surface.

According to the above, one or more exemplary embodiment of the display device includes the guide member detachably coupled to the mold frame, and thus damage to the display panel may be reduced or effectively prevented. According to the above, the guide member is temporarily disposed at a portion of the display device, and thus the display device may have a slim shape. In addition, since the guide member is removed from the finally-formed display device, the display device may have a slimmer shape.

BRIEF DESCRIPTION OF THE DRAWINGS

The above and other advantages of the present disclosure will become readily apparent by reference to the following detailed description when considered in conjunction with the accompanying drawings where.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure.

It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof it is to be understood that the singular forms "a," and "the" include plural referents unless the context clearly dictates otherwise. As used herein, the term "and/or" includes any and all combinations of one or more of the associated listed items.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present.

Like numbers refer to like elements throughout. The use of the terms first, second, etc. do not denote any order or importance, but rather the terms first, second, etc. are used to distinguish one element from another. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, the present disclosure will be explained in detail with reference to the accompanying drawings.

Figure 1:
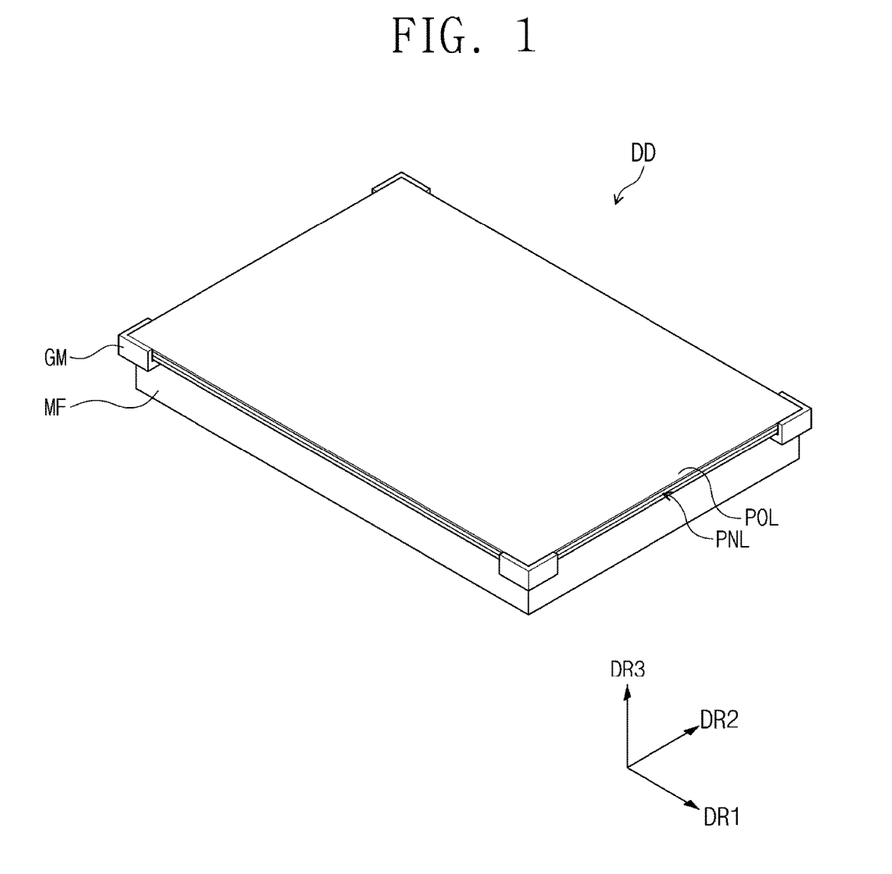
FIG. 1 is a perspective view showing an exemplary embodiment of a display device according to the invention.
Figure 2:
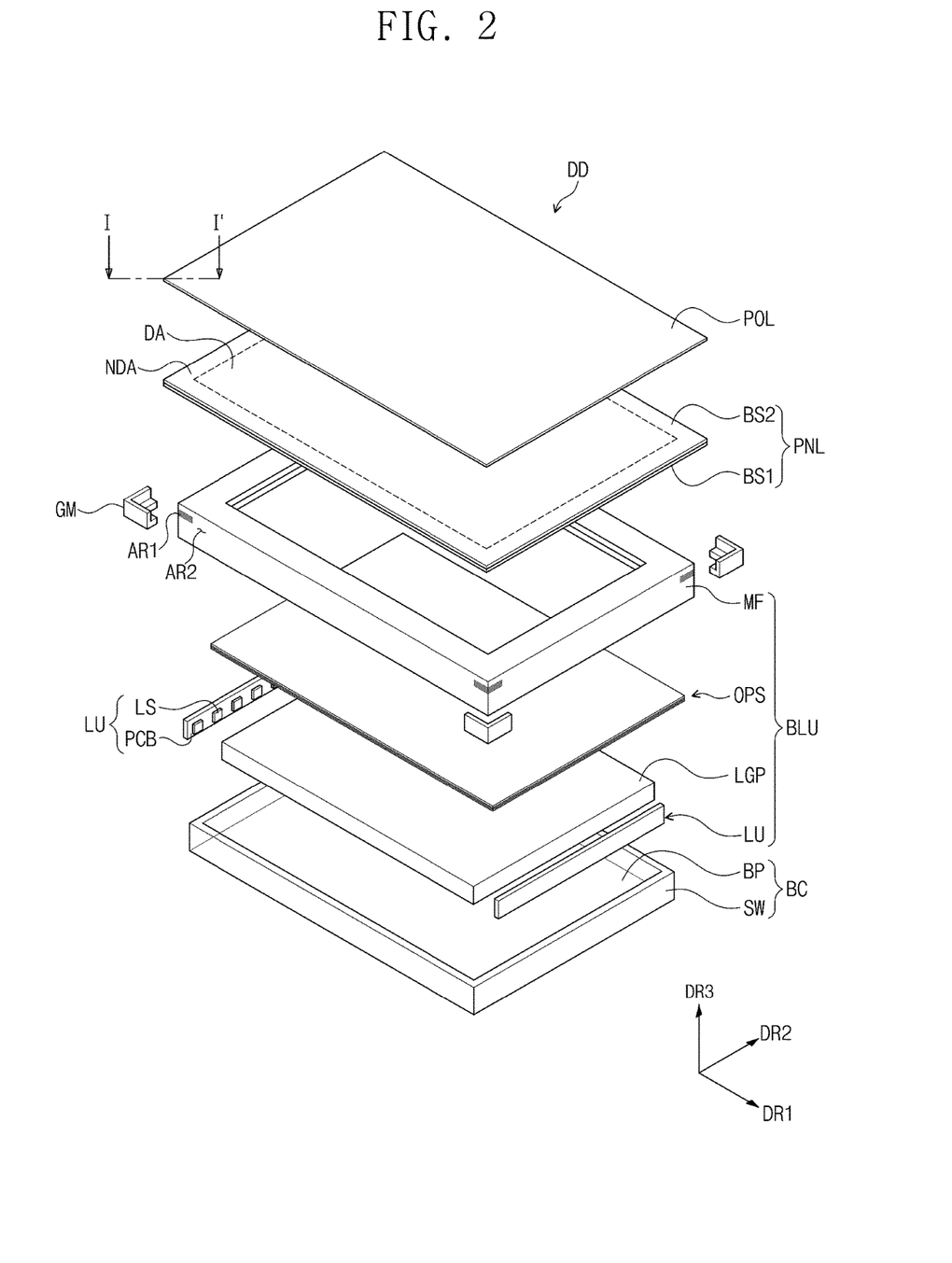
FIG. 2 is an exploded perspective view showing an exemplary embodiment of the display device of FIG. 1 according to the invention.
Figure 3:
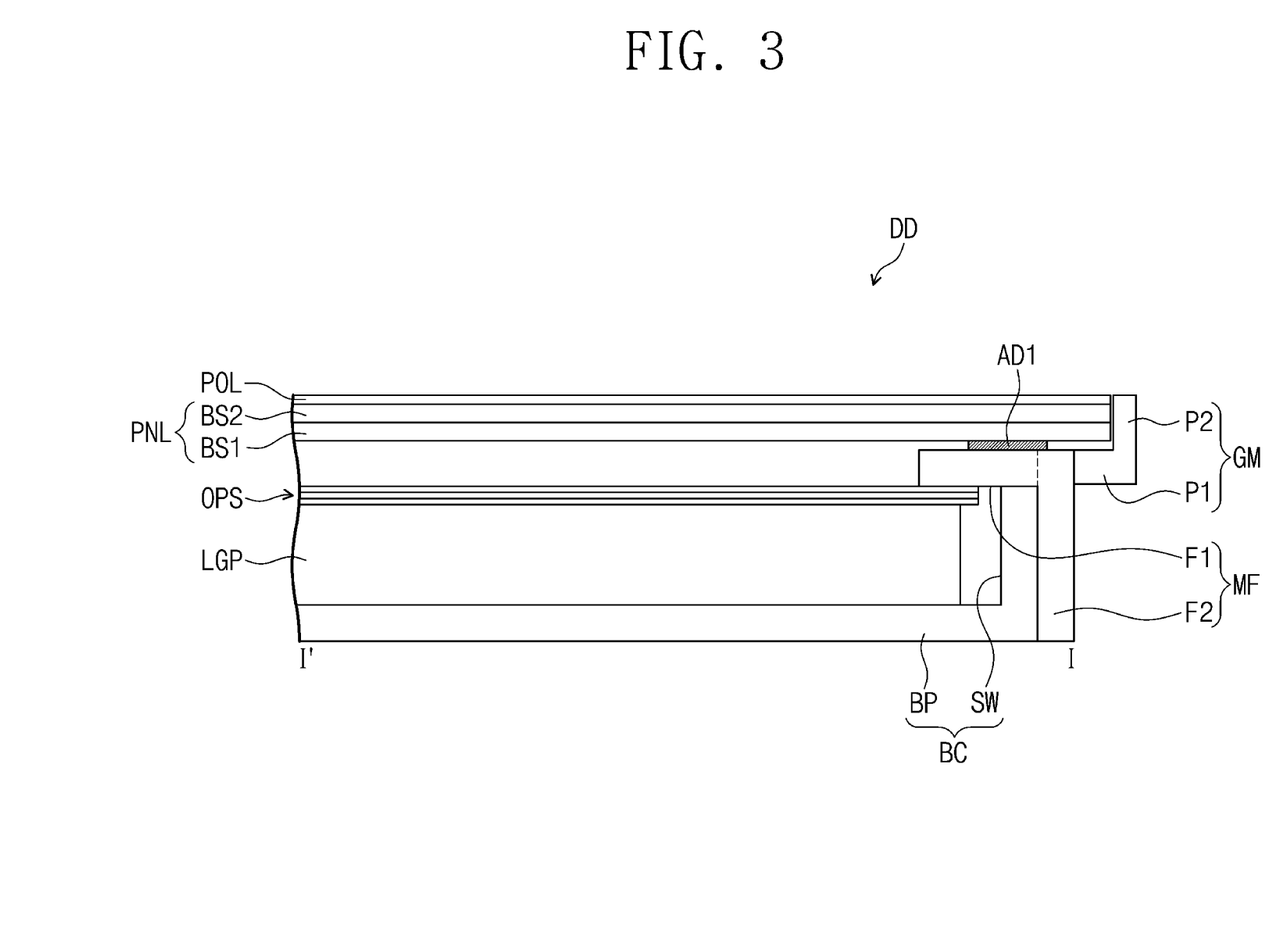
FIGS. 3 and 4 are cross-sectional views taken along line of I-I' of FIG. 2.
Figure 4:
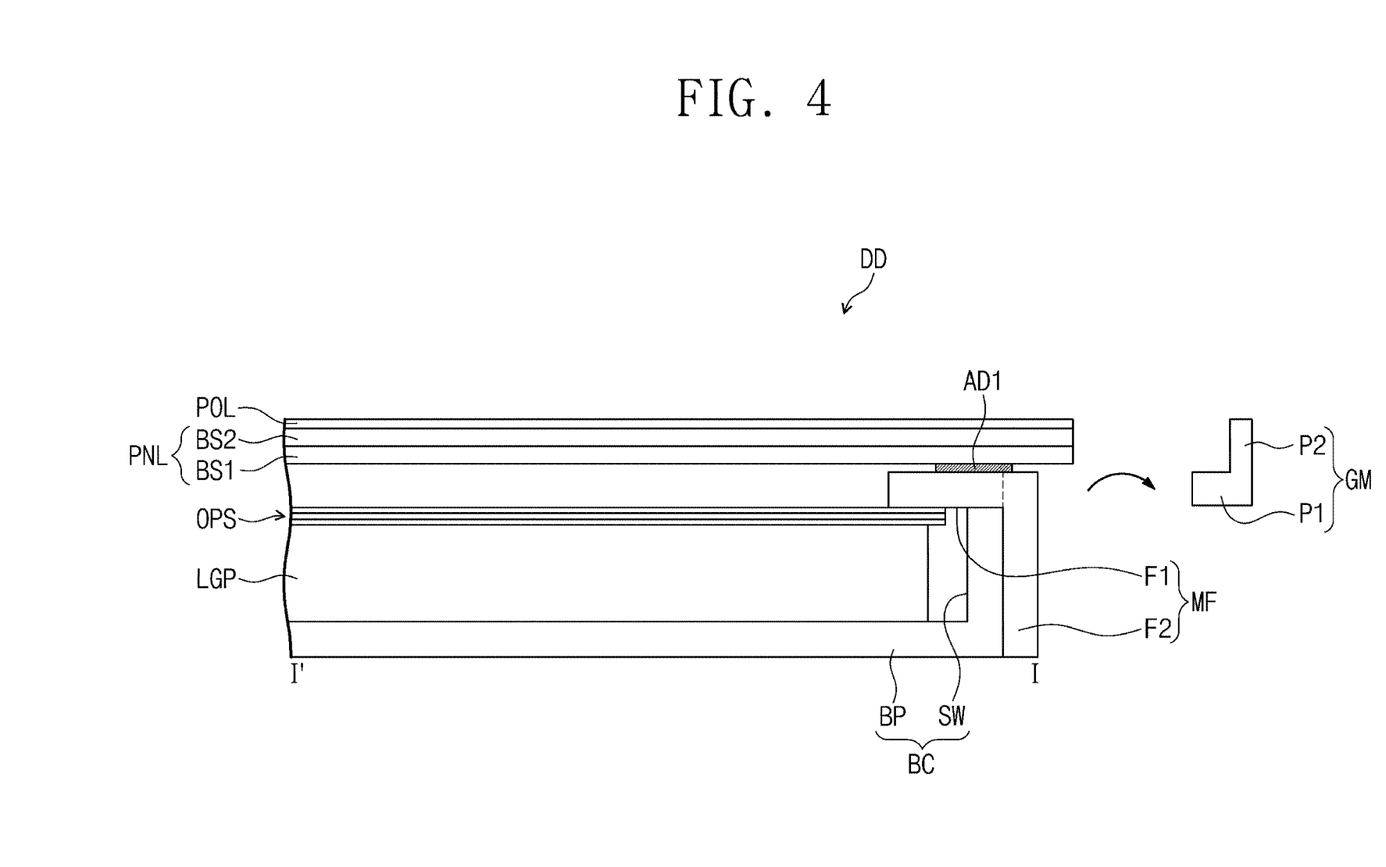

FIG. 1 is a perspective view showing an exemplary embodiment of a display device DD according to the invention, and FIG. 2 is an exploded perspective view showing the display device DD of FIG. 1 according to the invention. FIGS. 3 and 4 are cross-sectional views of the display device DD taken along line of I-I' of FIG. 2.

Referring to FIGS. 1 and 2, the display device DD includes a display panel PNL, a polarizing plate POL and a backlight unit BLU. Hereinafter, for the convenience of explanation, a direction to which an image is provided from the display device DD will be referred to as an upper direction and a direction opposite to the upper direction will be referred to as a lower direction. However, the upper direction and the lower direction are relative concepts and may be changed to another direction.

The display panel PNL displays the image thereon. The display panel PNL is a non-self emissive display panel, and the display panel PNL may be a liquid crystal display panel, an electrowetting display panel, an electrophoretic display panel or a microelectromechanical system display panel, but it should not be limited thereto or thereby. That is, the display panel PNL may be, but not limited to, an organic light emitting display panel or a plasma display panel. Since the organic light emitting display panel and the plasma display panel are self-emissive display panels, a portion of the backlight unit BLU may be omitted from the display device DD. Hereinafter, the liquid crystal display panel will be representatively described in detail as the display panel PNL.

The display panel PNL has a substantially quadrangular shape with two pairs of sides, each pair having two sides parallel to each other. In the illustrated exemplary embodiment, the display panel PNL has a substantially rectangular shape defined by a pair of relatively long sides extending in a first direction DR1 and a pair of relatively short sides extending in a second direction DR2 crossing the first direction DR1.

The display panel PNL includes or defines an upper surface on which the image is displayed, a rear surface opposite to the upper surface, and a side surface connecting the upper surface and the rear surface.

The upper surface of the display panel PNL includes a display area DA on which the image is displayed and a non-display area NDA surrounding the display area. No image is displayed in the non-display area NDA. The display area DA and the non-display area NDA may define a whole of the upper surface of the display panel PNL.

The display panel PNL includes a first base substrate BS1, a second base substrate BS2 facing the first base substrate BS1, and a liquid crystal layer (not shown) interposed between the first base substrate BS1 and the second base substrate BS2.

In the illustrated exemplary embodiment, the first base substrate BS1 includes therein a plurality of pixel electrodes (not shown) and a plurality of thin film transistors (not shown) electrically connected to the pixel electrodes in a one-to-one correspondence relationship. Within the first base substrate BS1, each of the thin film transistors is connected to a corresponding pixel electrode of the pixel electrodes to switch a driving signal applied to the corresponding pixel electrode.

The second base substrate BS2 may include therein a common electrode (not shown), which generates an electric field in cooperation with the pixel electrode of the first base substrate BS1 to control an alignment of liquid crystal molecules of the liquid crystal layer. The display panel PNL operates the liquid crystal molecules of the liquid crystal layer such that the image is displayed in a third direction DR3, e.g., the upper direction.

Although not shown in figures, the display panel PNL may be provided with a driving chip generating the driving signal, a tape carrier package on which the driving chip is mounted, and a printed circuit board electrically connected to the display panel PNL through the tape carrier package.

The polarizing plate POL is disposed on or over the display panel PNL in the third direction DR3. The polarizing plate POL has or defines a transmission axis extending in one direction. The polarizing plate POL transmits therethrough a portion of the lights exiting through the display panel PNL, e.g., a linearly-polarized light substantially parallel to the transmission axis, and absorbs another or remaining portion of the lights exiting through the display panel PNL, e.g., the light that is not linearly polarized.

Although not shown in figures, the display device DD may further include another polarizing plate similar to that described above, disposed under the display panel PNL in a direction opposite to the third direction DR3, and having or defining a transmission axis extending in a direction crossing the one direction of the polarizing plate POL.

The backlight unit BLU is disposed under the display panel PNL to provide the light to the display panel PNL. The backlight unit BLU includes a bottom chassis BC, a light guide plate LGP, a light source unit LU, an optical sheet OPS, a mold frame MF and a guide member GM.

The bottom chassis BC is disposed under the display panel PNL. The bottom chassis BC includes or defines a bottom portion BP facing the rear surface of the display panel PNL and a sidewall portion SW bent and extending from the bottom portion BP. The bottom portion BP facing the rear surface of the display panel PNL may be extended bent to define the sidewall portion SW.

The bottom portion BP is substantially parallel to a plane surface defined by the first direction DR1 and the second direction DR2. In the top plan view, the bottom portion BP has the rectangular shape corresponding to the shape of the display panel PNL. In the illustrated exemplary embodiment, the bottom portion BP has a size smaller than that of the display panel PNL in the top plan view. The sidewall portion SW extends in the third direction DR3 from the bottom portion BP and defines a predetermined inner surface or space of the bottom chassis BC in cooperation with the bottom portion BP.

The light guide plate LGP is disposed between the display panel PNL and the bottom portion BP to guide the light incident thereto to the display panel PNL. The light guide plate LGP may include a transparent polymer resin, e.g., polycarbonate, polymethyl methacrylate, etc.

The light guide plate LGP includes or defines a light incident surface, a light exit surface an opposite surface and side surfaces which connect the light exit surface and the opposite surface as two largest surfaces of the light guide plate LGP to each other. The light emitted from the light source unit LU is incident to the light guide plate LGP through the light incident surface thereof. Where the light source unit LU is disposed to face at least one side surface among the side surfaces, the one side surface may be defined as the light incident surface.

The light exit surface may be one surface among the two largest surfaces of the light guide plate LGP. The light exit surface is a plane surface facing the rear surface of the display panel PNL. The light incident to the light guide plate LGP through the light incident surface exits through the light exit surface toward the display panel PNL in the third direction DR3.

The opposite surface is the other surface among the two largest surfaces of the light guide plate LGP and opposes the light exit surface. The light incident to the light incident surface is reflected within a body of the light guide plate LGP between the light exit surface and the opposite surface while traveling between the light exit surface and the opposite surface.

The light source unit LU generates and provides the light to the light guide plate LGP and is disposed to face the light incident surface of the light guide plate LGP. The light source unit LU includes a light source LS and a printed circuit board PCB.

The light source LS is mounted on the printed circuit board PCB and generates and emits light. The light emitted from the light source LS is incident to the light guide plate LGP. The light source LS may be, but not limited to, a point light source, a linear light source or a surface light source. In the illustrated exemplary embodiment, the light source LS employs a light emitting diode LED as the point light source. As the light source LS, one LED or a plurality of LED groups may be provided.

A conductive line is disposed such as by printing on the printed circuit board PCB to provide a source voltage to the light source LS and control the source voltage. The printed circuit board PCB may include a light source controller (not shown) connected to the light source LS. The light source controller (not shown) analyzes the image displayed on the display panel PNL to output a local dimming signal and controls a brightness of the light source LS in response to the local dimming signal. The light source controller (not shown) may be mounted on an additional circuit board and a position of the light source controller should not be limited thereto or thereby.

The optical sheet OPS is provided between the display panel PNL and the light guide plate LGP. The optical sheet OPS controls the light emitted from the light source LS. The optical sheet OPS may include a plurality of individual sheets such as a diffusion sheet, a prism sheet and a protection sheet, which are stacked on the light guide plate LGP.

The diffusion sheet diffuses the light. The prism sheet condenses the light diffused by the diffusion sheet to a direction substantially perpendicular to the plane surface of the display panel PNL. The light is perpendicularly incident to the display panel PNL after passing through the prism sheet. The protection sheet is disposed on the prism sheet. The protection sheet protects the prism sheet from an external impact. In the illustrated exemplary embodiment, the optical sheet OPS includes one diffusion sheet, one prism sheet and one protection sheet, however the invention should not be limited thereto or thereby. In an exemplary embodiment, for instance, at least one of the diffusion sheet, the prism sheet and the protection sheet of the optical sheet OPS may be provided in a plural number and/or one or more sheets may be omitted if necessary. Also, the stacking order of the diffusion sheet, the prism sheet and the protection sheet within the optical sheet OPS may be changed.

The mold frame MF is disposed between the display panel PNL and the bottom chassis BC. The mold frame MF supports the display panel PNL thereon at a lower portion of the display panel PNL. In addition, the mold frame MF holds a position of the optical sheet OPS and the light source unit LU within the backlight unit BLU and/or the display device DD.

Referring to FIGS. 2 and 3, the mold frame MF may have a closed rectangular ring-shape of which portions thereof define lengths extending along an edge of the display panel PNL. The mold frame MF includes or defines a first frame portion F1 and a second frame portion F2.

The first frame portion F1 is disposed extended to face the rear surface of the display panel PNL. The first frame portion F1 is overlapped with the non-display area NDA of the display panel PNL. In the top plan view, a size of the non-display area NDA of the display panel PNL may be defined from an edge of the display panel PNL toward the display panel PNL, A dimension of the non-display area NDA from a respective edge of the display panel PNL may be taken in the first or second direction DR1 or DR2. In the illustrated exemplary embodiment, the first frame portion F1 has a size that is smaller than the size of the non-display area NDA in the top plan view. That is, the non-display area NDA of the display panel PNL may extend from an edge thereof to a distal end of the first frame portion F1. Therefore, since the size of the first frame portion F1 is smaller than that of the non-display area NDA, at least a portion of the edge of the display panel PNL is not overlapped with the mold frame MF. That is, a portion of the non-display area NDA may be exposed by the smaller-sized first frame portion F1. The first frame portion F1 is disposed on the bottom portion BP and the sidewall portion SW.

The second frame portion F2 is bent downwards from the side surfaces of the first frame portion F1 and extends in an opposite direction to the third direction DR3. The second frame portion F2 is disposed to face the sidewall portion SW. One of the first frame portion F1 and the second frame portion F2 may extend bent to define the other one of the first frame portion F1 and the second frame portion F2.

An outer surface of the second frame portion F2 includes a first area AR1 facing or overlapping the guide member GM and a second area AR2 except for the first area AR1 which does not face or overlap the guide member GM. That is, the guide member GM exposes the second area AR2 of the second frame portion F2. The first and second areas AR1 and AR2 may define a whole of the outer surface of the second frame portion F2.

In the illustrated exemplary embodiment, the display device DD further includes a first fixing (adhesive) member AD1 disposed between the rear surface of the display panel PNL and the first frame portion F1 of the mold frame MF. The first adhesive member AD1 fixes the display panel PNL to the mold frame MF. The first adhesive member AD1 may be, but not limited to, a double-sided tape or adhesive resin.

The mold frame MF may define plural first and second frame portions F1 and F2. Adjacent first and second frame portions F1 and F2 meet to define a corner of the mold frame MF. The guide member GM is coupled to at least one corner of the mold frame MF. As described above, a portion of edge of the display panel PNL may be exposed by the smaller-sized first frame portion F1 since the display panel PNL extends further than the mold frame MF. The exposed edge portions of the display panel PNL may be susceptible to damage since they extend further than the mold frame MF. The guide member GM protects at least one side surface of the display panel PNL. In an exemplary embodiment of the invention, the guide member GM is provided in plural and each of the guide members GM is coupled to a respective corner of the mold frame MF.

In detail, FIG. 3 shows a first state in which the guide member GM is coupled to the mold frame MF and FIG. 4 shows a second state in which the guide member GM is separated from the mold frame MF. Hereinafter, the guide member GM will be described in detail with reference to FIGS. 3 and 4.

The guide member GM includes or defines a first portion P1 and a second portion P2. In the first state, the first portion P1 is disposed to face the second frame portion F2. In the illustrated exemplary embodiment, the first portion P1 directly makes contact with the first area AR1 (see FIG. 2) of the second frame portion F2. In the first state, an inner surface defined by the first portion P1 is disposed to face and/or contact the outer surface of the second frame portion F2.

The second portion P2 is bent from the first portion P1 and extends in the third direction DR3 from the first portion P1. One of the first portion P1 and the second portion P2 may extend bent to define the other one the first portion P1 and the second portion P2. In the first state, the second portion P2 is disposed to face the side surface of the display panel PNL. In the first state, an inner surface defined by the second portion P2 is disposed to face and/or contact the side surface of the display panel PNL.

The guide member GM may include or be formed of a plastic, silicon, or metal material.

As shown in FIG. 4, the guide member GM is separated from the corner of the mold frame MF in the second state. In the second state, the display device DD is considered as being without a frame.

As discussed above, the exposed edge portions of the display panel PNL may be susceptible to damage since they extend further than the mold frame MF. In one or more exemplary embodiment of the invention, the guide member GM absorbs external impacts applied to the display panel PNL such as when the display device DD is manufactured, assembled and/or transported to reduce or effectively prevent damage to the display panel PNL particularly at the exposed edge portions thereof. According to one or more exemplary embodiment of the invention, the guide member GM is removably disposed at a portion of the display device DD, and thus a finally-formed display device DD may have a slim design. The guide member GM is removed after the display device DD is manufactured, assembled and/or transported, and thus the finally-formed display device DD may have a slimmer design.

Hereinafter, modified exemplary embodiments of a display device according to the invention will be described with reference to accompanying drawings. For the convenience of explanation, the modified exemplary embodiments will be described focusing on differences from the above mentioned exemplary embodiments. In addition, the same reference numerals denote the same elements in previous exemplary embodiments, and thus detailed descriptions of the same elements will be omitted.

Figure 5:
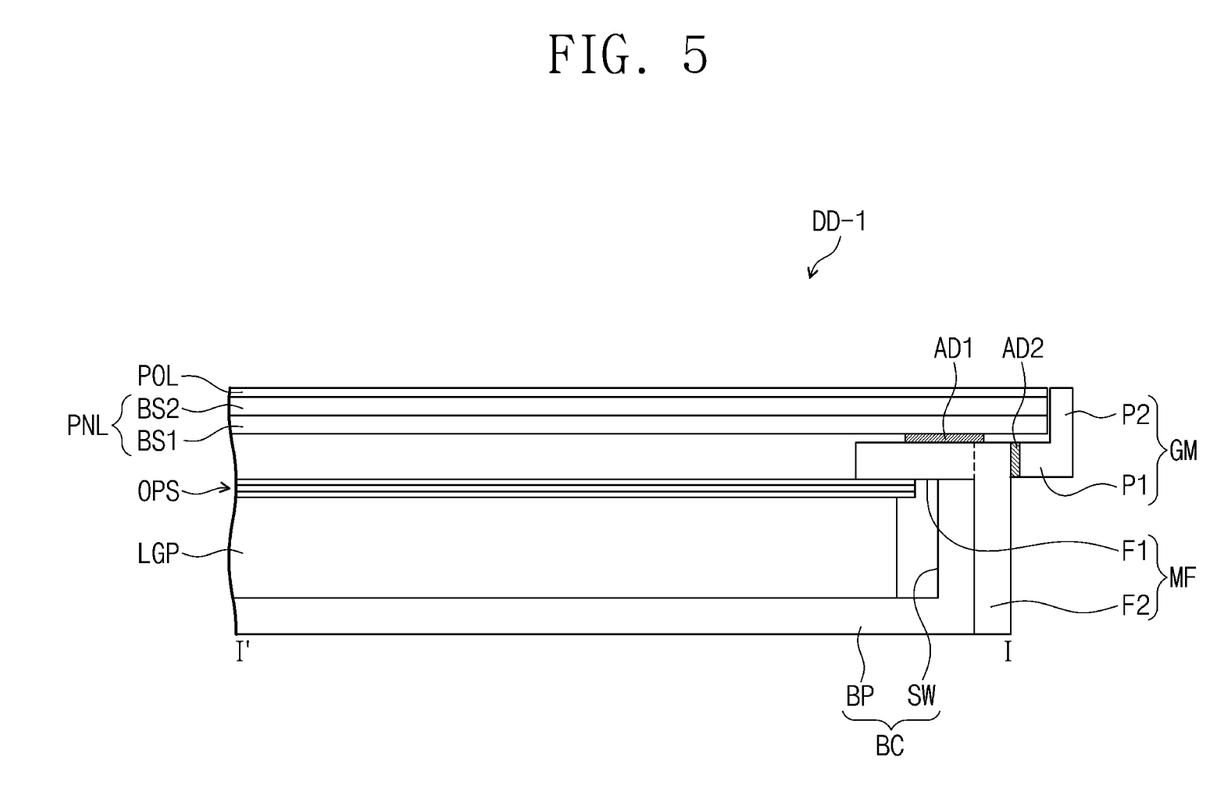
FIGS. 5 to 7 are cross-sectional views respectively showing modified exemplary embodiments of the display device of FIG. 1 according to the invention.
Figure 6:
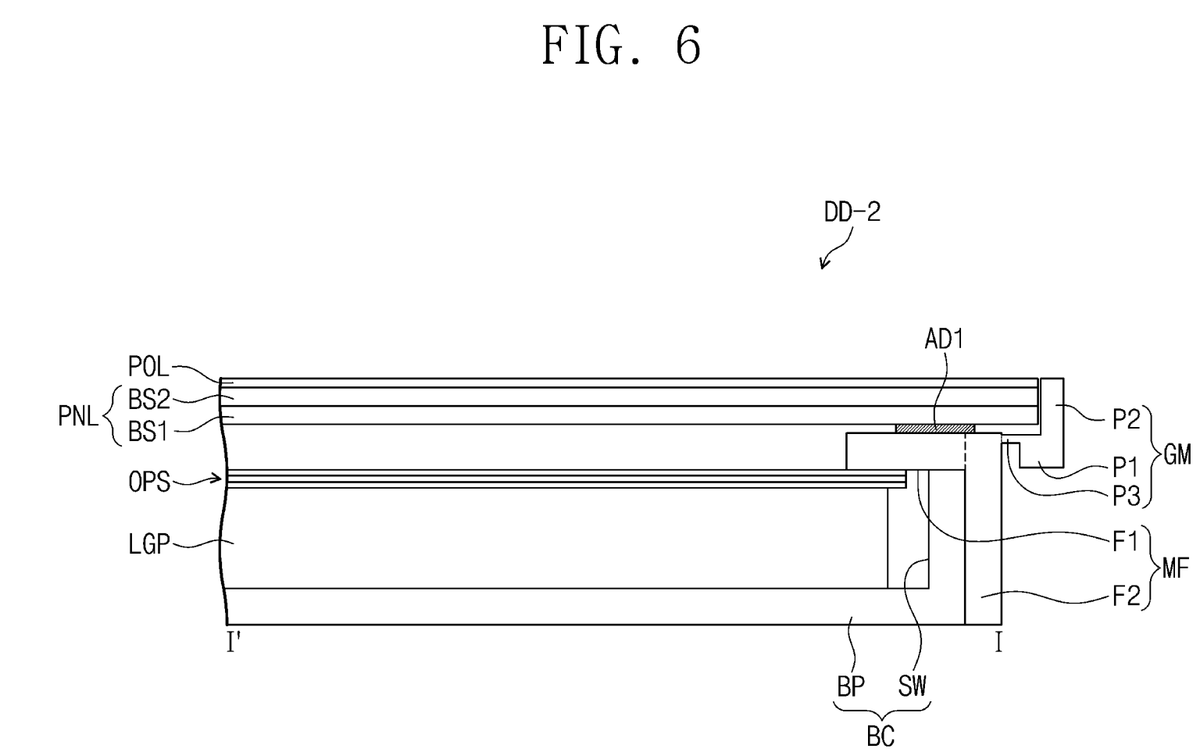
Figure 7:
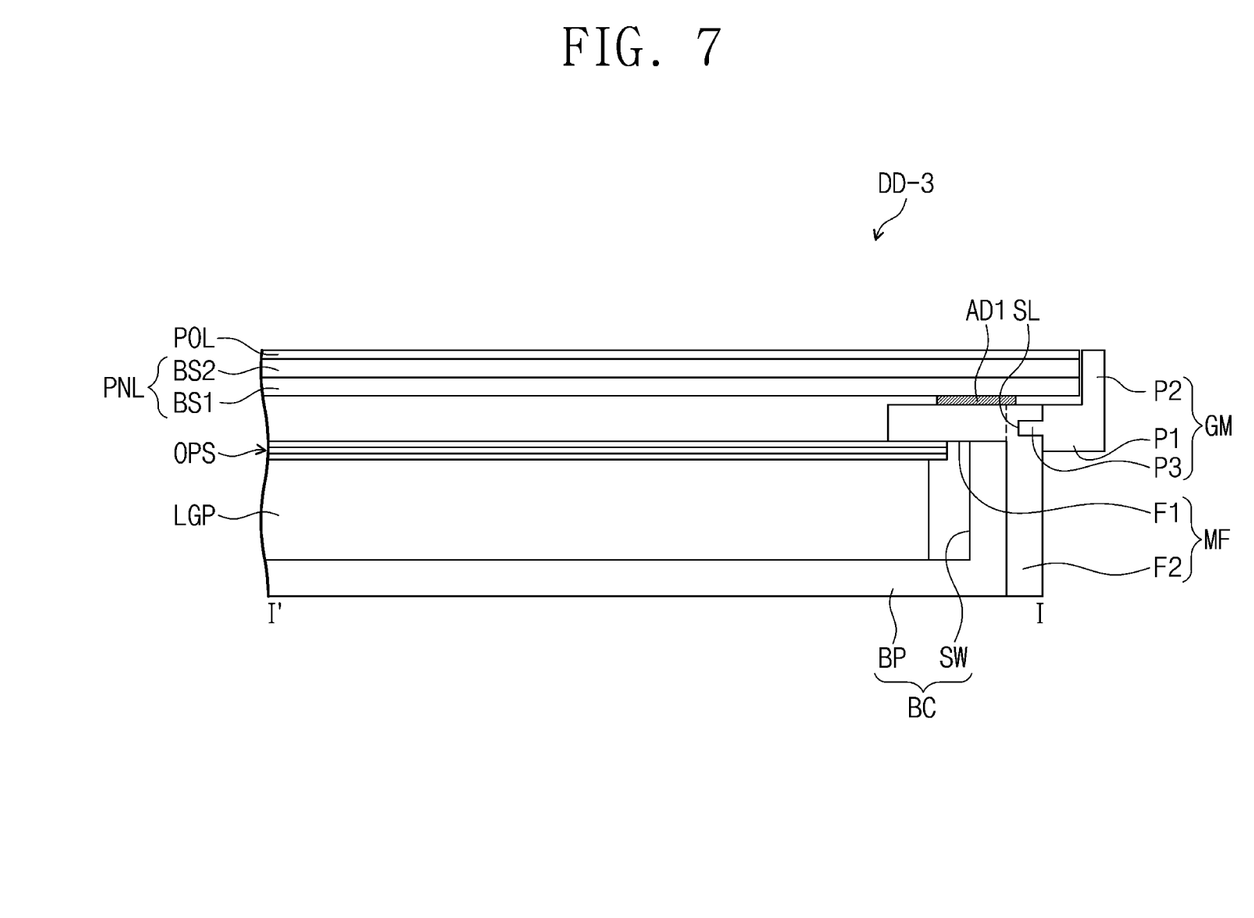

FIGS. 5, 6 and 7 are cross-sectional views showing modified exemplary embodiments of the display device in FIGS. 1 and 2 according to the invention. FIGS. 5, 6 and 7 are taken along line I-I' of FIG. 2.

Referring to FIG. 5, a display device DD-1 according to a modified exemplary embodiment of the invention further includes a second adhesive member AD2 to fix a guide member GM to a mold frame MF.

In a first state, the second adhesive member AD2 is disposed between a second frame portion F2 of the mold frame MF and a distal end of a first portion P1 of the guide member GM and is disposed to face a first area AR1 (see FIG. 2) of the mold frame MF.

The second adhesive member AD2 may be, but not limited to, a double-sided tape or an adhesive resin, which is easily attachable to and detachable from the guide member GM and the mold frame MF. Thus, the guide member GM may be easily attached to and detached from the mold frame MF to be removably disposed with the mold frame MF.

Referring to FIG. 6, in a display device DD-2 according to another modified exemplary embodiment of the invention disclosure, a guide member GM may be initially integral with a mold frame MF as a single unitary member. In an exemplary embodiment of a method of manufacturing a display device, the guide member GM and the mold frame MF are formed by an injection molding method using a plastic material such that one of the guide member GM and the mold frame MF extends to define the other of the guide member GM and the mold frame MF.

The guide member GM includes or defines a first portion P1, a second portion P2 and a third portion P3. Any of the first portion P1, the second portion P2 and the third portion P3 may extend bent to define another of the first portion P1, the second portion P2 and the third portion P3.

In a first state, a distal end surface of the first portion P1 is disposed to face a first area AR1 (see FIG. 2). The second portion P2 is bent from an upper surface of the first portion P1 at a first side thereof furthest from the display area DA and extends in a third direction DR3. The second portion P2 is disposed to face a side surface of a display panel PNL.

The third portion P3 extends from a second side of the first portion P1 closest to the display area DA and opposing the first side. With the guide member GM and the mold frame MF initially integral with each other, the third portion P3 extends from the distal end of the first portion P1 and is temporarily or detachably connected to a second frame portion F2 of the mold frame MF. To indicate the temporary or detachable connection of the guide member GM to the mold frame, a boundary or interface between the third portion P3 and the second frame portion F2 may be shown with a solid or dotted line. In a thickness direction (third direction DR3 and direction opposite thereto), the third portion P3 has a thickness smaller than a thickness of the first portion P1. The thicknesses may be a maximum thickness thereof defined by the respective portion.

To transition from the first state to a second state in which the guide member GM is separated from the mold frame MF, the connection between the third portion P3 and the second frame portion F2 at the boundary therebetween may be broken such as by an external force. In the second state, the guide member GM is detached from the mold frame MF by separation of the third portion P3 from the second frame portion F2 at the boundary therebetween.

Referring to FIG. 7, in a display device DD-3 according to still another modified exemplary embodiment of the invention, each of a guide member GM and a mold frame MF are initially separately formed and the separately formed guide member GM is assembled to the separately formed mold frame MF.

The guide member GM includes or defines a first portion P1, a second portion P2 and a third portion P3. Any of the first portion P1, the second portion P2 and the third portion P3 may extend bent to define another of the first portion P1, the second portion P2 and the third portion P3.

In a first state, a distal end surface the first portion P1 is disposed to face a first area AR1 (see FIG. 2). The second portion P2 is bent from an upper surface of the first portion P1 at a first side thereof furthest from the display area DA and extends in a third direction DR3. The second portion P2 is disposed to face a side surface of a display panel PNL.

The third portion P3 extends from a second side of the first portion P1 closest to the display area DA and opposing the first side, and is initially separate from a second frame F2 of the mold frame MF to be subsequently assembled therewith. The third portion P3 has a thickness smaller than a thickness of the first portion P1 in the third direction DR3.

In an exemplary embodiment of a method of manufacturing a display device, a portion of the second frame portion F2 of the mold frame MF is removed to define a recess exposed to outside the mold frame FM and to correspond to the shape of the third portion P3. The recess extended from an outer surface of the second frame portion F2 defines a slit SL at the first area AR1 of the mold frame MF. In the first state, the third portion P3 of the guide member GM is extended into the slit SL, and thus the guide member GM is held connected to the mold frame MF to be removably coupled to the mold frame MF. In addition, to transition from the first state to the second state in which the guide member GM is separated from the mold frame MF, the guide member GM is easily detached from the mold frame MF when the third portion P3 is removed from the slit SL.

Figure 8:
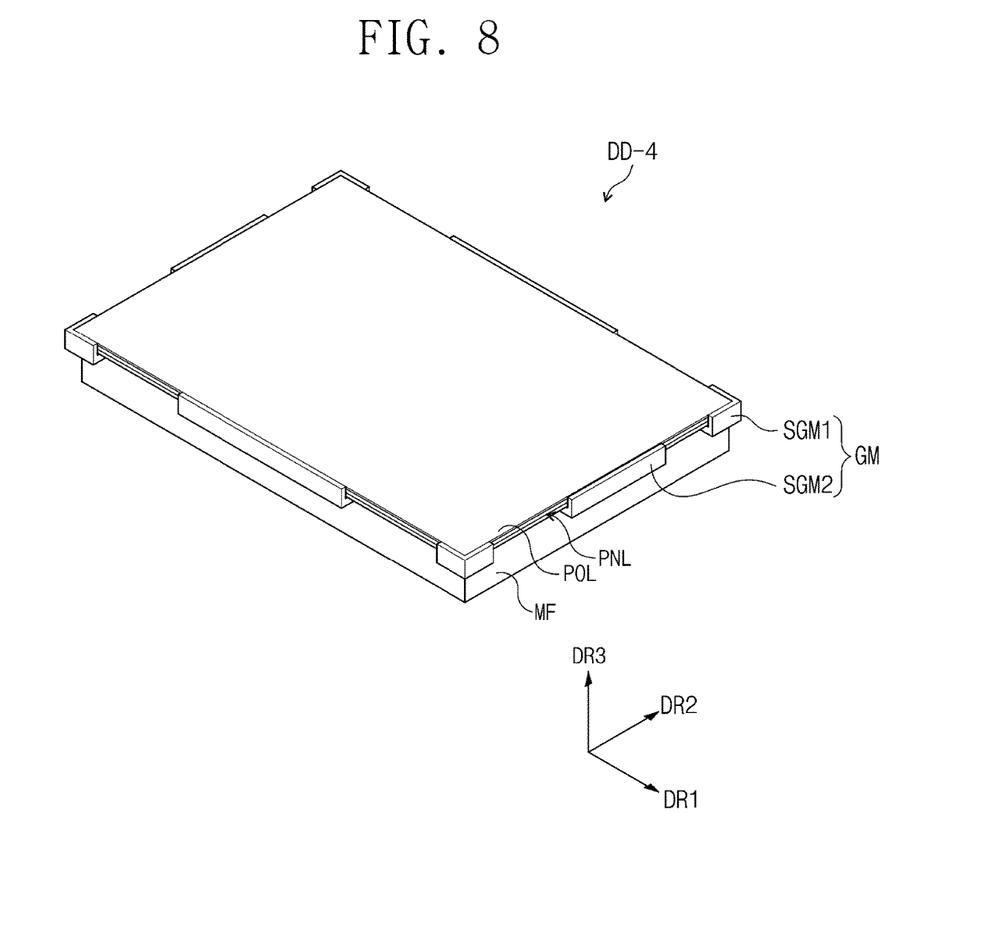
FIG. 8 is a perspective view showing another exemplary embodiment of a display device according to the invention.

FIG. 8 is a perspective view showing another exemplary embodiment of a display device according to the invention.

Referring to FIG. 8, in an exemplary embodiment of a display device DD-4 according to the invention, a guide member GM collectively includes multiple members such as a first sub-guide member SGM1 and a second sub-guide member SGM2. The first sub-guide member SGM1 and/or the second sub-guide member SGM2 may be provided in plural to define the guide member GM. The structure of the first sub-guide member SGM1, the second guide member SGM2 and the mold frame MF in FIG. 8 may correspond to any of the respective structures described above for FIGS. 3, 5, 6 and 7.

In a first state, the first sub-guide member SGM1 is disposed to correspond to one or more corner of a display panel PNL, at which one long side meets one short side of the display panel PNL. The second sub-guide member SGM2 is disposed to correspond to one or more long side and/or short side of the display panel PNL. In an exemplary embodiment the first sub-guide member SGM1 is disposed at each corner of the display panel PNL and the second sub-guide member SGM2 is disposed at each long side and each short side of the display panel PNL.

The first sub-guide member SGM1 and the second sub-guide member SGM2 adjacent to each other are spaced apart from each other along a length of the respective long side or short side by a predetermined distance. Since the first sub-guide member SGM1 and the second sub-guide member SGM2 absorb the external impact applied to the display panel PNL when the display device DD-4 is manufactured, assembled and/or transported, the first sub-guide member SGM1 and the second sub-guide member SGM2 protect the corners and the sides of the display panel PNL, thereby reducing or effectively preventing damage to the display panel PNL.

Figure 9:
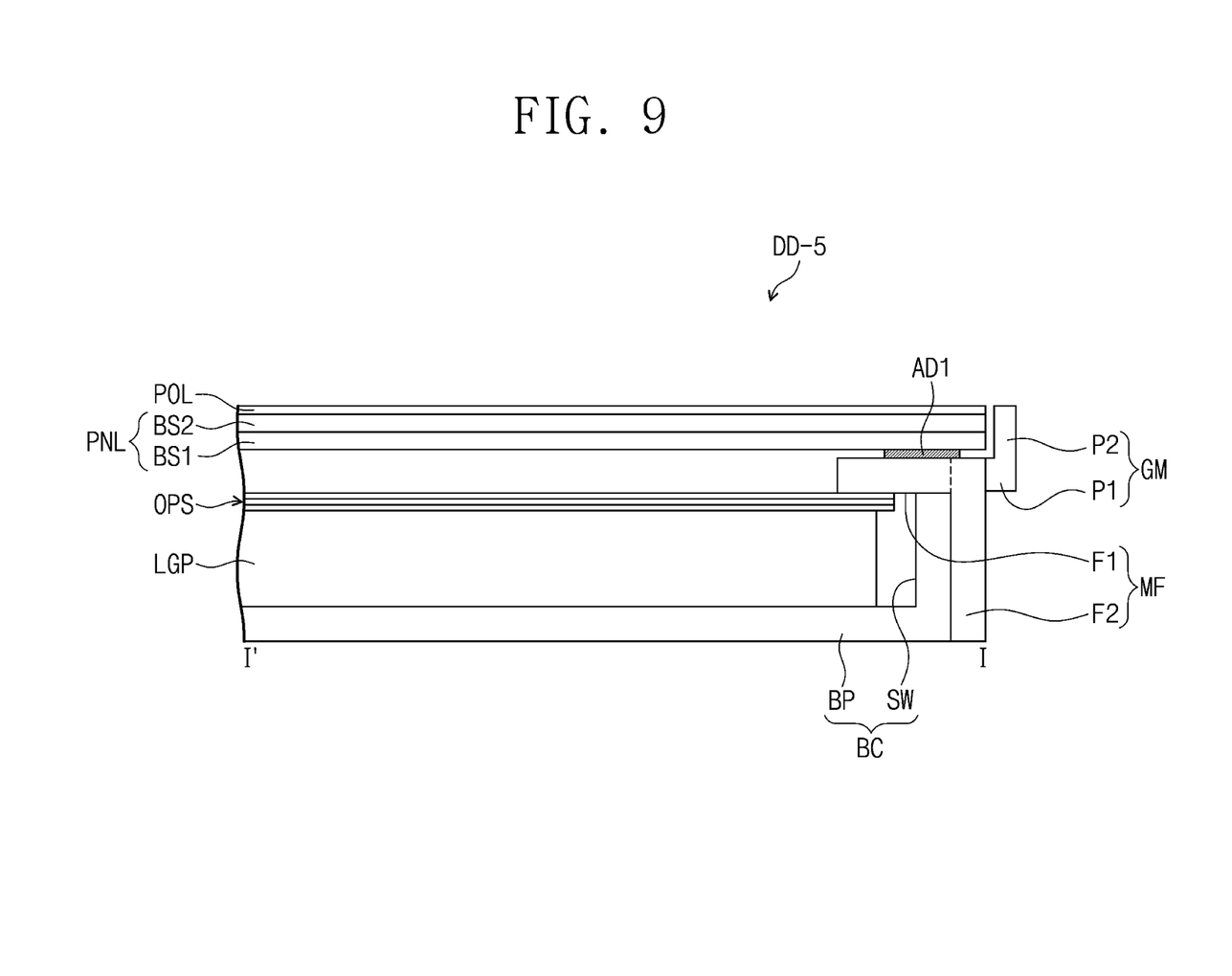
FIG. 9 is a cross-sectional view showing still another exemplary embodiment of a display device according to the invention.

FIG. 9 is a cross-sectional view showing still another exemplary embodiment of a display device according to the invention. FIG. 9 is taken along line I-I' of FIG. 2.

Referring to FIG. 9, in an exemplary embodiment of a display device DD-5 according to the invention, a display panel PNL has a size substantially the same as a size of a backlight unit BLU in the top plan view. In an exemplary embodiment, outer end surfaces of the display panel PNL and the mold frame MF may be coplanar with each other such that the display panel PNL does not extend further than the mold frame MF. A mold frame MF has a size substantially the same as a size of a non-display area NDA of the display panel PNL in the top plan view. In FIG. 9, the non-display area NDA of the display panel PNL may extend from an edge thereof to a distal end of the first frame portion F1.

A guide member GM includes a first portion P1 of which an inner surface thereof faces a second frame portion F2 of the mold frame MF and a second portion P2 of which an inner surface thereof faces a side surface of the display panel PNL. The structure of guide member GM and the mold frame MF in FIG. 9 may correspond to any of the respective structures described above for FIGS. 3, 5, 6 and 7.

Since the guide member GM absorbs the external impact applied to the display panel PNL when the display panel PNL is manufactured, assembled and/or transported to protect the side surface of the display panel PNL, damage to the display panel PNL is reduced or effectively prevented. According to the guide member GM which is removably disposed at a portion of the display device DD-5, the display device DD-5 may have a slim design.

Also, since the guide member GM is detached from the mold frame MF in a final form of the display device DD-5, the display device DD-5 according to one or more exemplary embodiment of the invention may have a slimmer design.

Although exemplary embodiments of the present disclosure have been described, the invention should not be limited to these exemplary embodiments but various changes and modifications can be made by one ordinary skilled in the art within the spirit and scope of the present disclosure as hereinafter claimed.

What is claimed is:

1. A display device comprising:
   a display panel comprising an upper surface at which an image is displayed, a rear surface facing the upper surface, and a side surface connecting the upper surface and the rear surface to each other;
   a mold frame disposed under the display panel and defining a first frame portion facing the rear surface of the display panel and a second frame portion extended bent downwards from side surfaces of the first frame portion; and
   a guide member detachably coupled to a corner of the mold frame, the guide member defining:
      a first portion thereof configured to face an outer surface of the second frame portion of the mold frame, and
      the first portion extending bent in a direction away from the outer surface of the second frame portion of the mold frame to define a second portion of the guide member which is disposed further from the display panel than the first portion and disposed extending bent in an upper direction away from the first portion,
   wherein within a same one of the guide member, the second portion disposed further from the display panel than the first portion is configured to face the side surface of the display panel when the first portion faces the outer surface of the second frame portion.

2. The display device of claim 1, wherein
   the guide member attached to the mold frame defines a first state of the display device,
   and the guide member detached from the mold frame defines a second state of the display device.

3. The display device of claim 2, wherein the outer surface of the second frame portion of the mold frame defines a first area thereof facing the first portion of the guide member and a second area thereof except for the first area.

4. The display device of claim 3, wherein the first portion of the guide member directly makes contact with the first area of the second frame portion of the mold frame, in the first state of the display device.

5. The display device of claim 3, further comprising an adhesive member overlapped with the first area of the second frame portion of the mold frame and disposed between the second frame portion of the mold frame and the first portion of the guide member to detachably couple the guide member to the mold frame.

6. The display device of claim 3, wherein the first portion of the guide member extends toward the second frame portion of the mold frame to further define a third portion of the guide member connected to the outer surface of the second frame portion and extending further than a distal end of the first portion.

7. The display device of claim 6, wherein the third portion of the guide member has a thickness smaller than a thickness of the first portion of the guide member in a direction substantially perpendicular to the upper surface of the display panel.

8. The display device of claim 7, wherein the second frame portion of the mold frame extends to define the guide member and the first to third portions thereof.

9. The display device of claim 8, wherein in the second state of the display device, the guide member is detached from the mold frame at a boundary between the third portion of the guide member and the second frame portion of the mold frame.

10. The display device of claim 6, wherein in the first area of the second frame portion of the mold frame, the second frame portion defines a slit recessed from the outer surface of the second frame portion, a shape of the slit corresponding to a shape of the third portion of the guide member.

11. The display device of claim 10, wherein in the first state of the display device, the third portion of the guide member extends into the slit defined in the second frame portion of the mold frame to detachably couple the guide member and the mold frame to each other.

12. The display device of claim 1, further comprising an adhesive member disposed between the display panel and the first frame portion of the mold frame.

13. The display device of claim 1, wherein in a top plan view of the display device,
the upper surface of the display panel defines a display area at which the image is displayed and a non-display area which surrounds the display area and at which the image is not displayed, and
the mold frame has a ring shape extending along the non-display area.

14. The display device of claim 13, wherein in the top plan view of the display device,
the first frame portion of the mold frame is overlapped with the non-display area of the display panel, and
the non-display area of the display panel has a size larger than a size of the first frame portion to extend further than the mold frame in a direction away from the display area of the display panel,
wherein the non-display area of the display panel extended further than the mold frame disposes the side surface of the display panel further from the display area than the outer surface of the second frame portion of the mold frame.

15. The display device of claim 13, wherein in the top plan view of the display device,
the first frame portion of the mold frame is overlapped with the non-display area of the display panel, and
the first frame portion has a same size as the non-display area to define the side surface of the display panel and the outer surface of the second frame portion of the mold frame which faces the first portion of the guide member, coplanar with each other.

16. A display device comprising:
a display panel comprising an upper surface at which an image is displayed with light, a rear surface facing the upper surface, and a side surface connecting the upper surface and the rear surface to each other; and
a backlight unit which is disposed under the display panel and provides light to the display panel, the backlight unit comprising:
a light source assembly which generates the light and provides the light to the display panel;
a bottom chassis defining a bottom portion thereof facing the rear surface of the display panel, the bottom portion extended bent to define a sidewall portion of the bottom chassis extending toward the display panel;
a mold frame defining a first frame portion disposed overlapping the bottom portion and the sidewall portion of the bottom chassis, and a second frame portion extended bent downwards from side surfaces of the first frame portion to face an outer surface of the sidewall portion of the bottom chassis; and
a guide member detachably coupled to the mold frame, the guide member defining:
a first portion thereof configured to face an outer surface of the second frame portion of the mold frame in a first state of the display device in which the guide member is attached to a corner of the mold frame, and
the first portion extending bent in a direction away from the outer surface of the second frame portion of the mold frame to define a second portion of the guide member which is disposed further from the display panel than the first portion and disposed extending bent in an upper direction away from the first portion,
wherein within a same one of the guide member, the second portion disposed further from the display panel than the first portion is configured to face the side surface of the display panel in the first state of the display device,
wherein in a second state of the display device, the guide member is detached from the mold frame.

17. The display device of claim 16, wherein in a top plan view of the display device, the display panel has a same size as the backlight unit to define the side surface of the display panel and the outer surface of the second frame portion of the mold frame which faces the first portion of the guide member, coplanar with each other.

18. The display device of claim 16, wherein in a top plan view of the display device,
the upper surface of the display panel defines a display area at which the image is displayed, and
the display panel has a size greater than a size of the backlight unit to extend further than the mold frame of the backlight unit in a direction away from the display area of the display panel,
wherein the display panel extended further than the mold frame of the backlight unit disposes the side surface of the display panel further from the display area than the outer surface of the second frame portion of the mold frame.

19. The display device of claim 18, wherein
the display device defines plural side surfaces thereof, wherein adjacent side surfaces meet to form plural corners of the display panel, and
the guide member comprises:
a first sub-guide member facing each corner among the plural corners of the display panel, within a same one of the first sub-guide member, the second portion is configured to face each of the adjacent side surfaces of the display panel at the each corner when the first portion faces the outer surface of the second frame portion at the each corner, and
a second sub-guide member facing a single one side surface among the plural side surfaces of the display panel.

20. The display device of claim 19, wherein the first sub-guide member at a respective corner of the display panel and the second sub-guide member at a respective side surface of the display panel are spaced apart from each other by a predetermined distance along the respective side surface.

\* \* \* \* \*